United States Patent
Arlt

(10) Patent No.: US 9,180,614 B2
(45) Date of Patent: Nov. 10, 2015

(54) METHOD FOR PRODUCING A DECORATIVE PART

(75) Inventor: Ulrich Arlt, Heilsbronn (DE)

(73) Assignee: NBHX TRIM GMBH, Heilsbronn (DE)

( * ) Notice: Subject to any disclaimer, the term of this patent is extended or adjusted under 35 U.S.C. 154(b) by 76 days.

(21) Appl. No.: 13/808,210

(22) PCT Filed: Jun. 29, 2011

(86) PCT No.: PCT/EP2011/060951
§ 371 (c)(1),
(2), (4) Date: Jan. 3, 2013

(87) PCT Pub. No.: WO2012/004174
PCT Pub. Date: Jan. 12, 2012

(65) Prior Publication Data
US 2013/0119581 A1    May 16, 2013

(30) Foreign Application Priority Data

Jul. 7, 2010 (DE) .......................... 10 2010 026 554

(51) Int. Cl.
*B29C 45/14* (2006.01)
*B29C 45/16* (2006.01)
*B29L 31/30* (2006.01)

(52) U.S. Cl.
CPC ....... *B29C 45/14688* (2013.01); *B29C 45/1671* (2013.01); *B29C 2045/14868* (2013.01); *B29L 2031/3041* (2013.01)

(58) Field of Classification Search
None
See application file for complete search history.

(56) References Cited

U.S. PATENT DOCUMENTS

| | | | | |
|---|---|---|---|---|
| 4,876,915 A | * | 10/1989 | Iuchi | 74/552 |
| 5,527,502 A | * | 6/1996 | Kiuchi et al. | 264/250 |
| 6,264,869 B1 | * | 7/2001 | Notarpietro et al. | 264/247 |
| 6,468,458 B1 | * | 10/2002 | Anderson et al. | 264/246 |
| 6,579,485 B2 | * | 6/2003 | Smith et al. | 264/247 |
| 7,674,414 B2 | * | 3/2010 | Neitzke | 264/241 |
| 7,981,342 B2 | * | 7/2011 | Hayes et al. | 264/241 |
| 2006/0138699 A1 | * | 6/2006 | Zollner et al. | 264/255 |
| 2007/0141353 A1 | * | 6/2007 | Neitzke | 428/411.1 |
| 2007/0194487 A1 | * | 8/2007 | Neitzke | 264/255 |
| 2009/0174121 A1 | | 7/2009 | Hayes et al. | |

FOREIGN PATENT DOCUMENTS

| | | |
|---|---|---|
| DE | 199 14 092 A1 | 10/1999 |
| DE | 10 2004 035 759 A1 | 3/2006 |
| EP | 1 488 958 A1 | 12/2004 |
| EP | 1 716 993 A1 | 11/2006 |

OTHER PUBLICATIONS

International Search Report dated Sep. 13, 2011 issued in PCT/EP2011/060951.

* cited by examiner

*Primary Examiner* — Edmund Lee
(74) *Attorney, Agent, or Firm* — Scully, Scott, Murphy & Presser, P.C.

(57) ABSTRACT

The invention relates to a method for producing a decorative part, comprising the method steps, in sequence, of: placing and locating a decorative element in a mold, applying an initially substantially liquid plastics coating over the entire surface of the decorative element, reinforcing the decorative element by solidifying the plastics coating, and subsequently applying a support structure to the substantially solidified plastics layer of the reinforced decorative element.

14 Claims, 3 Drawing Sheets

METHOD FOR PRODUCING A DECORATIVE PART

The invention relates to a method for producing a decorative part consisting of a decorative element and a support structure arranged directly thereon.

Steadily increasing requirements have been placed on decorative parts in recent years. In the automotive field in particular, they are no longer used as functional surface cladding but must, particularly at the high end of the market, meet very strict requirements in terms of visual, haptical and mechanical quality. The lustre, transparency of the visible region and a homogenous, sprueless surface of the component are among such visual or haptical requirements. From a mechanical, physical or even chemical perspective, a high resistance to abrasion and scratching, adequate toughness under impact and a sufficiently high resistance to gas release effects and signs of ageing, such as discolouration, should be ensured.

Aside from the high quality requirements placed on the product itself, in particular a process-optimised method sequence is necessary, the aims of which should necessarily be to achieve not only reduced production times and costs but also an increased degree of automation and assured procedural safety.

Up to now, basically three methods, namely the laminating method, the injection-moulding method and the die-casting method, have been used in the prior art to produce cladding parts and ornamental parts (decorative parts). The present invention relates to a new method sequence for an injection-moulding method, since the laminating and die-casting methods are too inefficient for batch production involving a high degree of automation.

A method for producing a decorative shaped part is known from DE 10 2004 035 759 A1, in which the decorative material is separately overmoulded from either side, the material remaining between the closed die halves of the injection-moulding tool after overspraying a first side.

EP 1 716 993 B1 discloses a method for producing a veneered shaped part, in which the final contour of the shaped part is produced by means of a pressing operation and force-introduction points are then moulded by means of injection moulding.

DE 199 14 092 C2 discloses a method and a device for producing a cladding and ornamental part, in which a decorative element is inserted in an injection mould and injection moulding compound is supplied by means of a feed funnel, meaning that the decorative element is surrounded entirely within the injection mould by the injection moulding compound.

The methods described above are disadvantageous either in that it is not provided to directly provide the decorative part with the necessary support structure, thus necessitating additional production steps in order to finish the component, or in that a support structure which is directly applied to the decorative element can lead to sink marks or to uneven warpage of the entire component upon cooling. Defects are visible after setting of the plastics material on the surface of the decorative part. These types of sink marks arise in particular as a result of the support structure having a large number of connection and reinforcement elements to ensure reliable attachment to the vehicle. The various cross-sections and the large number of material accumulations within a structure even cause in-homogeneous vibratory behaviour and adversely affect the visible face of a decorative part during cooling.

Accordingly, it is an object of the present invention to provide a method with which it is possible to produce decorative parts of the highest quality and free from defects with a higher degree of automation with respect to the prior art.

The object of the invention is achieved by the method according to the preamble of the present claim 1. A decorative part is produced according to the invention using the steps which proceed in this order. First, a decorative element is inserted in a moulding tool and fixed therein in such a way that displacement is not possible during the injection moulding operation. A substantially liquid plastics layer is then applied over the entire surface of the decorative element to ensure coating of the complete surface of the decorative element. The plastics layer solidifies, reinforcing the decorative element in all directions. Finally, a support structure is applied to the plastics layer on the rear face of the reinforced decorative element.

"Decorative part" shall be understood herein to mean the entire component to be produced using the method. "Decorative element" shall be understood to mean a base structure inserted in and fixed to a tool, around which base structure a plastic layer is formed by injecting moulding, for example wood-veneer inlays. The term "support structure" refers herein to the construction arranged on the rear face of the decorative part, which construction is used to connect or attach the decorative part at the position of use, for example the dashboard of a passenger car.

For the plastics layer, any material may be used which can be processed using injection moulding technology, plastics materials such as acrylic glass, polycarbonate or styrene-acrylonitrile being used for this industrial purpose. The processing temperature for ensuring that the plastics material is applied in liquid form varies from one plastics material to another in terms of the range within which it falls, it being possible to introduce polycarbonate into the injection moulding tool at, for example, between 280° C. and 320° C. under high injection pressure. Preferably, styrene-acrylonitrile is used in the present case, since this can be processed at considerably lower temperatures (220° C. to 250° C.) and the plastics material is exceptionally weather resistant. The requirements for the support structure differ from those for the plastics layer, and acrylonitrile-butadiene-styrene is therefore preferably used for the support structure, chopped and/or continuous fibres optionally, but not necessarily, also being inserted in the support structure to ensure added reinforcement of the plastics material. By processing two different plastics materials in an injection moulding tool, it is possible to adapt each component to the requirements during the particular use; that is to say, the support structure can have high holding forces, without breaking, while the visible face of the decorative element of the decorative part ensures the best possible surface qualities and high durability.

The application of the support structure to the plastics layer of the decorative element takes place in the same tool in a process-integrated manner, the decorative part always remaining in the fixed state within the tool, even as the support structure is applied by means of injection moulding technology in the subsequent method step.

The plastics layer surrounding the decorative element cures after injection moulding or flow-coating, affording the decorative element the rigidity required for the processes which follow. In contrast with previous methods, the support structure is connected only after the surface of the decorative element has been sealed by means of the plastics layer, and the decorative element therefore does not deform during cooling, as it does in the prior art, as a result of the tensile forces introduced by the support structure which is moulded on; instead, said decorative element maintains its original shape without sink marks or defects.

In an advantageous embodiment, the decorative element can be encapsulated by injection-moulding or flow-coating with the corresponding plastics material, at the corresponding processing temperature thereof. The surface structure resulting from this method does not require finishing, meaning that after removing the component which is later finished, no further method steps are necessary, as a result of which production times and costs are considerably reduced.

In an advantageous embodiment, a protective layer can be provided on the decorative element in addition to a styrene-acrylonitrile layer, thereby eliminating possible detrimental properties of the plastics layer (hygroscopicity, yellow discolouration) and increasing the wear resistance of the visible face of the decorative element. After the plastics layer solidifies, the protective layer is likewise applied by means of injection moulding technology to the visible face of the decorative element, polyurethane preferably being used for this purpose.

In a preferred embodiment of the invention, the plastics layer is constructed so as to be of the precise thickness at which durability of the decorative part is ensured, while at the same time production costs and times, in particular the time required for solidifying and hardening during cooling, are low. The plastics layer has a thickness of from 0.5 to 5 mm, preferably 0.5 to 3 mm, more preferably 0.5 to 2 mm, optimally 0.5 to 1.2 mm. The specified parameters relate to the finished product and can be checked by cutting open the decorative part and measuring the layer thickness with a vernier calliper.

Hereafter, further advantages of the invention are illustrated in more detail, as is the description of a preferred embodiment of the invention, with reference to the drawings, in which.

The appended drawings are, by way of example, schematic illustrations. In the drawings, like components are in each case provided with like reference numerals. Furthermore, only those elements are shown which are essential for understanding the invention.

Figure 1:
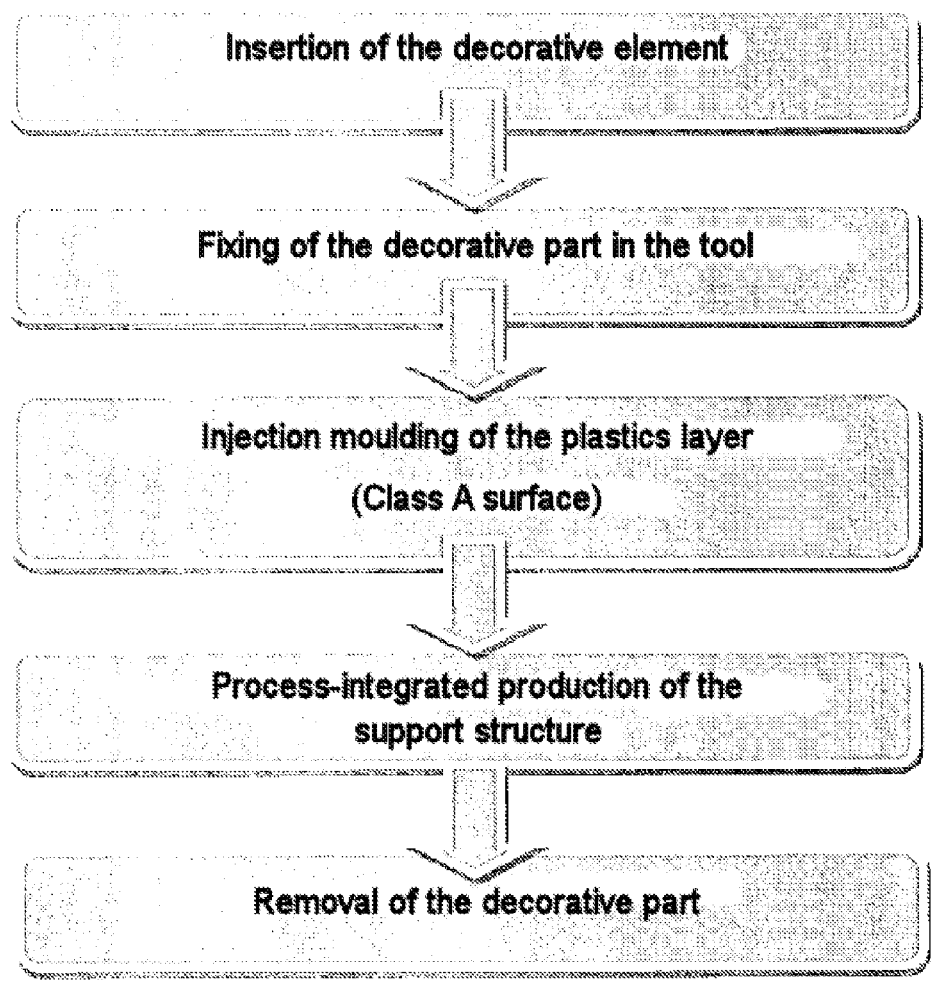
FIG. 1 shows a first method sequence.
Figure 2:
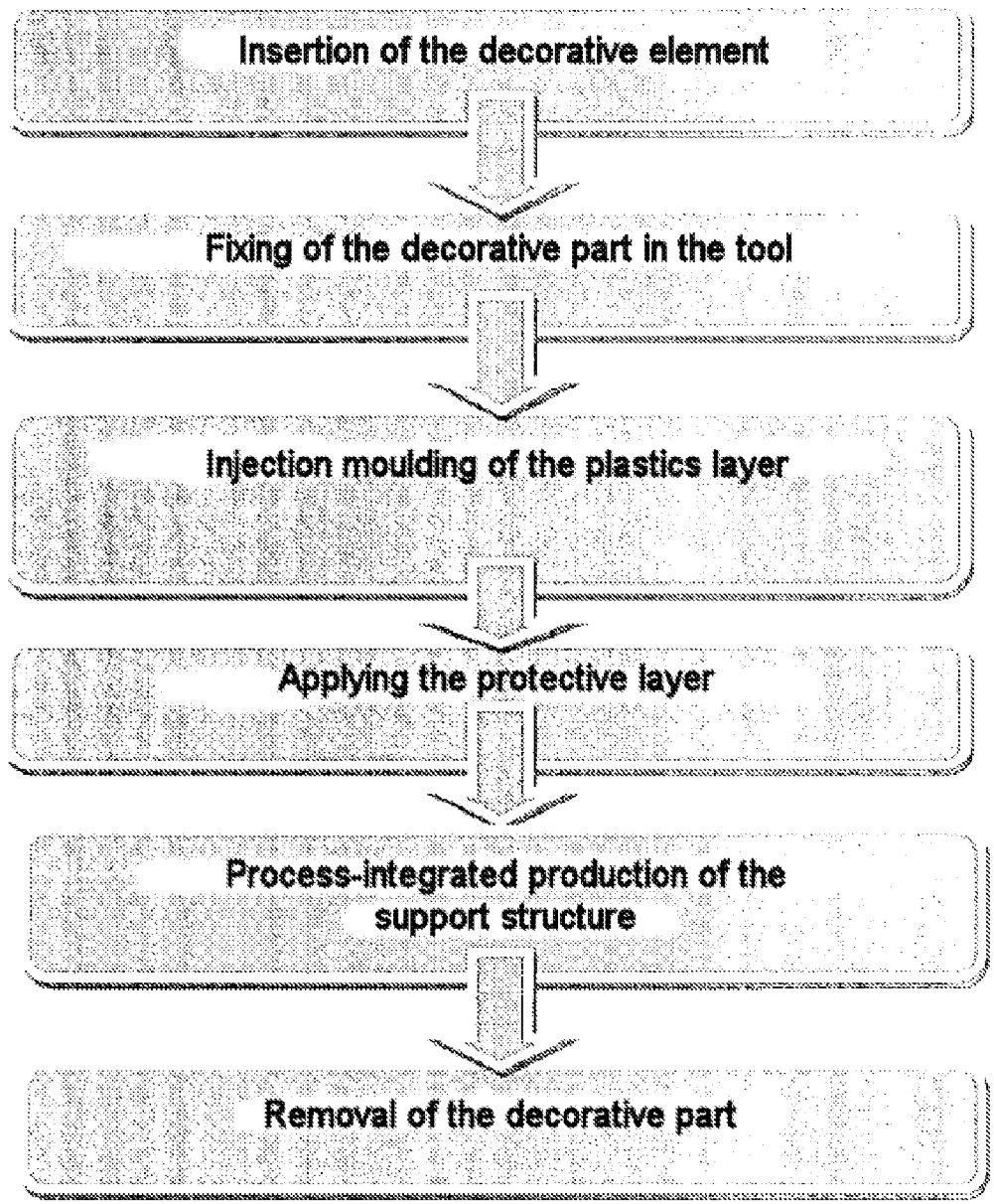
FIG. 2 shows a second method sequence.

FIGS. 1 and 2 show method sequences of the method according to the invention. In accordance with a first method sequence according to FIG. 1, the decorative element is first inserted in the injection moulding tool, being fixed therein in the second method step in such a way that it does not shift out of place during the injection moulding operation. Then, in the third method step, the decorative element is entirely encapsulated with plastics material by injection moulding, thus producing a completely closed plastics layer around the decorative element. In accordance with the method according to FIG. 1, the plastics layer forms the subsequent external layer, which is able to form the visible face of the decorative part without a finishing process. In a fourth method step, the support component is directly moulded onto the rear face of the decorative element surrounded by the plastics layer, in a process-integrated manner, without it having been necessary to alter the position of the decorative element in the tool. The plastics layer increases the rigidity of the decorative element, such that no warpage of the surface of the decorative element occurs during the cooling of the plastics support structure.

In contrast to the method in accordance with FIG. 1, the method in accordance with FIG. 2 has an additional method step, specifically in that an additional protective layer is applied to the plastics layer after it has cooled. The protective layer can be applied only to the visible face of the decorative element or, like the plastics layer, right round the decorative element. The use of a protective layer has the advantage of making it possible to use a light and easily processible material as the plastics layer, which material would not necessarily meet on its own the surface prerequisites placed on the visible face of the decorative part. These prerequisites are thus met by the additional protective layer, and the entire decorative part is therefore nevertheless able to fulfil the very strict requirements in terms of the surface (class A) and in terms of the stability of the support structure.

Figure 3:
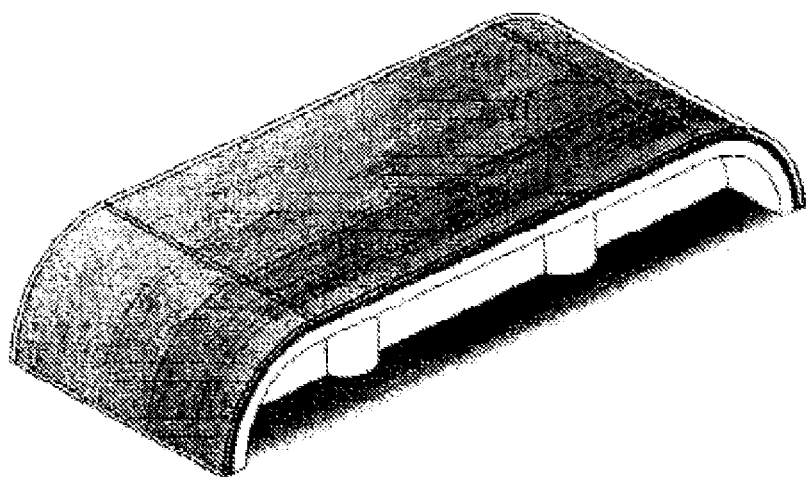
FIG. 3 is a perspective view of a decorative part produced by the first method.

FIG. 3 shows a decorative part 1 which has been produced by the method according to the invention and has, on the visible surface, a transparent plastics layer 2 which forms the surface of the decorative part 1. The decorative element 3, which is constructed in the present case as a wood veneer having a grain extending in the longitudinal direction, is entirely covered by the plastics layer 2. On its rear face, the decorative part 1 has a support structure 4 which is directly moulded onto the rear face of the decorative element 3. The support structure 4 has connection points 5 for attachment for example to vehicle dashboards. With methods according to the prior art, connections 5 of this type give rise to defects on the visible face of the decorative element 3 during the cooling of the plastics layer. Conversely, in the present case the plastics layer 2 is applied to the decorative element 3 prior to application of the support structure, meaning that the decorative element 3 already has an increased rigidity during moulding of the support structure 4.

The invention claimed is:

1. A method for producing a decorative part that can be used with a vehicle, the method comprising:
   inserting and fixing a decorative element in a tool;
   applying an initially substantially liquid plastic layer over the entire surface of the decorative element to encapsulate the decorative element with the plastic layer;
   reinforcing the decorative element by solidification of the plastic layer; and
   applying a support structure to the substantially solidified plastic layer of the reinforced decorative element.

2. The method for producing a decorative part according to claim 1, wherein the application of the support structure is carried out in the same tool in a process-integrated manner.

3. The method for producing a decorative part according to claim 1, wherein the application of the plastic layer over the entire surface of the decorative element to encapsulate the decorative element is implemented through injection moulding or flow-coating.

4. The method for producing a decorative part according to claim 1, wherein the tool comprises a turnover-table tool.

5. The method for producing a decorative part according to claim 1, further comprising providing a protective layer on the plastic layer at a visible side of the decorative part.

6. The method for producing a decorative part according to claim 1, wherein after the solidification of the plastic layer, the support structure is moulded onto the solidified plastic layer of the decorative element through injection moulding.

7. The method for producing a decorative part according to claim 1, wherein the plastic layer has a thickness of between 0.5 mm and 1.2 mm.

8. The method for producing a decorative part according to claim 1, wherein the support structure comprises a plurality of connection and reinforcement elements.

9. The method for producing a decorative part according to claim 8, wherein the plastic layer is formed from at least one of acrylic glass (PMMA), polycarbonate (PC) and styrene-acrylonitrile (SAN).

10. The method for producing a decorative part according to claim 9, wherein the support structure is formed from acrylonitrile-butadiene-styrene (ABS).

11. The method for producing a decorative part according to claim 10, wherein the support structure comprises at least one of chopped fibres and continuous fibres.

12. The method for producing a decorative part according to claim 1, wherein the decorative element comprises a wood-veneer inlay.

13. The method for producing a decorative part according to claim 1, wherein the decorative element is in a fixed state during the application of the plastic layer, the solidification of the plastic layer and the application of the support structure.

14. The method for producing a decorative part according to claim 5, wherein the protective layer encapsulates the plastic layer.

* * * * *